United States Patent
Wei

(10) Patent No.: US 10,663,299 B2
(45) Date of Patent: May 26, 2020

(54) STABILIZER CONTROL SYSTEM AND METHOD

(71) Applicant: Guilin Feiyu Technology Corporation Ltd., Guilin, Guangxi (CN)

(72) Inventor: Chengyun Wei, Guilin (CN)

(73) Assignee: Guilin Feiyu Technology Corporation Ltd., Guilin (CN)

( * ) Notice: Subject to any disclaimer, the term of this patent is extended or adjusted under 35 U.S.C. 154(b) by 169 days.

(21) Appl. No.: 16/038,226

(22) Filed: Jul. 18, 2018

(65) Prior Publication Data

US 2019/0331495 A1  Oct. 31, 2019

(30) Foreign Application Priority Data

Apr. 28, 2018 (CN) .......................... 2018 1 0399334

(51) Int. Cl.
*G01C 21/18* (2006.01)
*G01C 21/20* (2006.01)
*G03B 17/56* (2006.01)

(52) U.S. Cl.
CPC ............. *G01C 21/18* (2013.01); *G01C 21/20* (2013.01); *G03B 17/561* (2013.01); *G03B 2217/002* (2013.01)

(58) Field of Classification Search
CPC .... G03B 17/561; G03B 17/563; G03B 17/56; G03B 17/566; F16M 11/18; F16M 13/04; F16M 2200/041; F16M 11/123; F16M 11/10; F16M 11/2071; F16M 13/00; F16M 11/045; F16M 11/048; F16M 2200/044; F16M 11/12; F16M 11/041

USPC .......................................................... 33/318
See application file for complete search history.

(56) References Cited

U.S. PATENT DOCUMENTS

| | | | | |
|---|---|---|---|---|
| 9,229,295 | B2 * | 1/2016 | Chen | G03B 5/00 |
| 10,139,711 | B1 * | 11/2018 | Wei | G03B 17/563 |
| 2010/0053344 | A1 * | 3/2010 | Tsukamoto | G03D 17/00 |
| | | | | 348/208.4 |
| 2014/0016200 | A1 * | 1/2014 | Chen | G03B 5/00 |
| | | | | 359/557 |
| 2016/0021168 | A1 * | 1/2016 | Chaudhri | H04L 67/025 |
| | | | | 715/740 |
| 2019/0137852 | A1 * | 5/2019 | Li | F16M 11/2071 |
| 2019/0215451 | A1 * | 7/2019 | Enke | G08B 21/182 |
| 2019/0331495 | A1 * | 10/2019 | Wei | G03B 17/561 |

* cited by examiner

*Primary Examiner* — Yaritza Guadalupe-McCall

(57) ABSTRACT

The present invention provides a stabilizer control system and method, wherein the system comprises a detecting module, a controlling module, a driving module, a feedback module and a motor; the detecting module detects posture information of a stabilizer, and sends the posture information to the controlling module; the controlling module receives the posture information of the stabilizer and issues a command to the driving module according to a preset control strategy; an input end of the driving module is connected with an output end of the controlling module, the output end of the driving module is electrically connected with the motor; the driving module receives the command from the controlling module and adjusts a rotating speed of the motor according to the command; the feedback module detects the rotating speed of the motor and sends rotating speed data of the motor to the controlling module.

6 Claims, 2 Drawing Sheets the content of which are incorporated herein by reference.

STABILIZER CONTROL SYSTEM AND METHOD

CROSS-REFERENCE TO PRIOR APPLICATION

This application claims the benefit of Chinese Patent Application No. 201810399334.9 filed on Apr. 28, 2018, the contents of which are incorporated herein by reference.

FIELD OF THE INVENTION

The present invention relates to stabilizer field, more particularly to a stabilizer control system and method.

BACKGROUND OF THE INVENTION

The stabilizer is used to fix the target object, adjust the attitude of the target object (for example, with regards to directional motion, rolling motion and pitching motion) and stabilize the target object in a determined posture, so as to enable the target object to achieve stable, smooth, and multi-angle shooting. So far, the target objects are mobile phones, video cameras and cameras.

At present, the existing stabilizer algorithm can only adapt to shooting device of which weight and size is within preset ranges. When weight and size of a shooting device is out of the preset ranges, it will not bring a good control effect on the stabilizer.

SUMMARY OF THE INVENTION

According to the above statement, an object of the present invention is to provide a stabilizer control system and method, so as to solve the problem that the control algorithm of the stabilizer in the prior art can only adapt to a shooting device of which weight and size is within preset ranges and will not bring a good control effect on the stabilizer.

The present disclosure provides a stabilizer control system, wherein the stabilizer control system comprises a detecting module, a controlling module, a driving module, a feedback module and a motor;

the detecting module detects posture information of a stabilizer, and sends the posture information to the controlling module;

a first input end of the controlling module is connected with the detecting module; the controlling module receives the posture information of the stabilizer and issues a command to the driving module according to a preset control strategy;

an input end of the driving module is connected with an output end of the controlling module, the output end of the driving module is electrically connected with the motor; the driving module receives the command from the controlling module and adjusts a rotating speed of the motor according to the command;

the feedback module detects the rotating speed of the motor and sends rotating speed data of the motor to the controlling module.

Preferably, the detecting module is a gyro; the gyro detects the posture information of the stabilizer, and sends the posture information of the stabilizer to the controlling module.

Preferably, the motor is a brushless motor.

Preferably, the feedback module is a magnetic encoder; the magnetic encoder detects the rotating speed of the motor and sends the rotating speed data of the motor to the controlling module.

Preferably, the driving module is a FOC vector control inverter.

In order to achieve the same object, the present disclosure further provides a stabilizer control method, wherein the method comprises:

S1, obtaining an actual angular velocity of a target object;

S2, receiving the actual angular velocity of the target object, implementing a deviation calculation on a target angular velocity of the target object to generate a deviation value;

S3, implementing a cascade PID control on the deviation value to obtain a PID value corresponding to the deviation value, analyzing the PID value corresponding to the deviation value, outputting an adjustment signal to a driving module;

S4, controlling a rotating speed of a motor according to the adjustment signal;

S5, detecting the rotating speed of the motor to obtain a feedback signal related to the rotating speed of the motor, sending the feedback signal related to the rotating speed of the motor to a controlling module to adjust the PID value corresponding to the deviation value.

Embodiments of the present invention have the following beneficial effects:

The stabilizer control system according to the present disclosure comprises a detecting module, a controlling module, a driving module, a feedback module and a motor; the detecting module detects posture information of a stabilizer, and sends the posture information to the controlling module; a first input end of the controlling module is connected with the detecting module; the controlling module receives the posture information of the stabilizer and issues a command to the driving module according to a preset control strategy; an input end of the driving module is connected with an output end of the controlling module, the output end of the driving module is electrically connected with the motor; the driving module receives the command from the controlling module and adjusts a rotating speed of the motor according to the command; the feedback module detects the rotating speed of the motor and sends rotating speed data of the motor to the controlling module. It can be seen that the stabilizer control system according to the present disclosure can detect posture information of a target object in real time. The posture information detected by the detecting module is different when target objects with different weights and sizes are arranged on the stabilizer, thus the posture information received by the controlling module is also different. The controlling module implements control according to the received posture information through a preset control strategy. When characteristic values of the posture information are different from those of preset posture information, the controlling module sends an adjustment signal to the driving module, then the drive device adjusts states of the motor, and the change of the states of the motor further enables the stabilizer to adapt to different target objects.

The stabilizer control method according to the present disclosure is based on the stabilizer control system, which has high reliability and efficiency. The stabilizer control method is implemented by generating a deviation value and enabling the controlling module to issue a command to adjust motion states of the motor according to the deviation value. Through the cascade PID control, the controlling module can adaptively select PID characteristic values according to the deviation value, thereby satisfying the stability requirement of the target object mounted on the stabilizer. By setting a feedback module, a closed loop system is formed by the controlling module, the driving module, the motor and the feedback module, thereby obtaining adaptive matching PID characteristic values. Since vibration state of the motor reflects vibration state of the target object, PID range is constantly adjusted according to the vibration state of the motor to obtain the adaptive matching PID characteristic values. In conclusion, when target objects with different weights are placed on the stabilizer, the variances of the detecting module are different due to different moments of inertia of the target objects, and the deviation values obtained by the controlling module are also different. The PID characteristic values obtained by the controlling module through the cascade PID control are also different, so that the controlling module can issue an adjustment signal to adjust the motion state of the motor. Therefore, the PID characteristic values are adjusted adaptively to realize that the stabilizer can adapt to different target objects.

DESCRIPTION OF THE REFERENCE NUMERALS

1. Target object; 2. Detecting module; 3. Controlling module; 4. Driving module; 5. Motor; 6. Feedback module.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
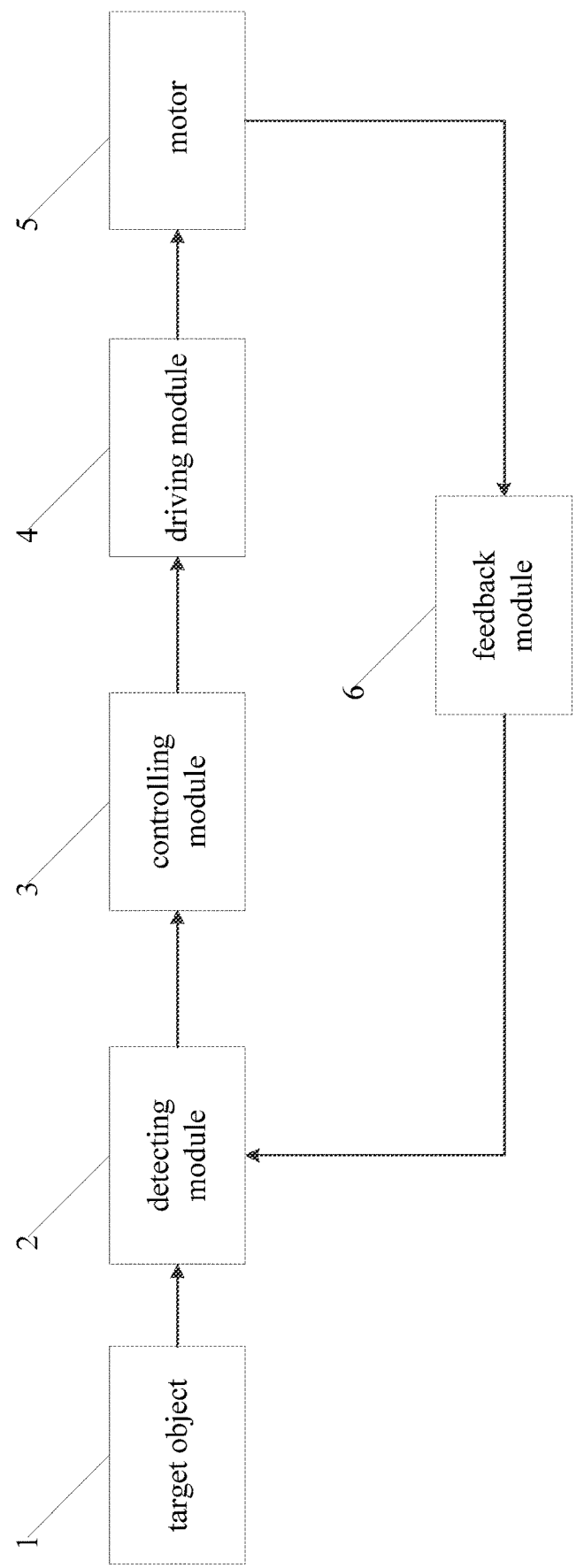
FIG. 1 is a schematic structural diagram of a stabilizer control system according to an embodiment of the present invention.

With reference to FIG. 1, a stabilizer control system according to the present embodiment comprises a detecting module 2, a controlling module 3, a driving module 4, a feedback module 6 and a motor 5;

the detecting module 2 detects posture information of a stabilizer, and sends the posture information to the controlling module 3;

a first input end of the controlling module 3 is connected with the detecting module 2; the controlling module 3 receives the posture information of the stabilizer and issues a command to the driving module 4 according to a preset control strategy;

an input end of the driving module 4 is connected with an output end of the controlling module 3, the output end of the driving module 4 is electrically connected with the motor 5; the driving module 4 receives the command from the controlling module 3 and adjusts a rotating speed of the motor 5 according to the command;

the feedback module 6 detects the rotating speed of the motor 5 and sends rotating speed data of the motor 5 to the controlling module 3.

Based on the above arrangement, the stabilizer control system according to the present embodiment, comprises a detecting module 2, a controlling module 3, a driving module 4, a feedback module 6 and a motor 5; the detecting module 2 detects posture information of a stabilizer, and sends the posture information to the controlling module 3; a first input end of the controlling module 3 is connected with the detecting module 2; the controlling module 3 receives the posture information of the stabilizer and issues a command to the driving module 4 according to a preset control strategy; an input end of the driving module 4 is connected with an output end of the controlling module 3, the output end of the driving module 4 is electrically connected with the motor 5; the driving module 4 receives the command from the controlling module 3 and adjusts a rotating speed of the motor 5 according to the command; the feedback module 6 detects the rotating speed of the motor 5 and sends rotating speed data of the motor 5 to the controlling module 3. It can be seen that the stabilizer control system according to the present disclosure can detect posture information of a target object 1 in real time. The posture information detected by the detecting module 2 is different when target objects 1 with different weights and sizes are mounted on the stabilizer, thus the posture information received by the controlling module 3 is also different. The controlling module 3 implements control according to the received posture information through a preset control strategy. When characteristic values of the posture information are different from those of preset posture information, the controlling module 3 sends an adjustment signal to the driving module 4, then the drive device adjusts states of the motor 5, and the change of the states of the motor 5 further enables the stabilizer to adapt to different target objects.

In the present embodiment, as shown in FIG. 1, in order to improve the detection of basic parameters of the target object 1 mounted on the stabilizer, the detecting device is a gyro; the gyro detects the posture information of the stabilizer, and sends the posture information of the stabilizer to the controlling module 3. Particularly, when target objects 1 with different weights are mounted on the stabilizer, moments of inertia of the target objects 1 are different, so that the variances of the gyro are different, thereby vibration state of the target object 1 mounted on the stabilizer can be identified.

In the present embodiment, as shown in FIG. 1, in order to improve the operational stability and work efficiency of the entire control system, the motor 5 is a brushless motor 5. The brushless motor 5 has the characteristics of no brush, low interference, low noise, smooth operation, long life and low maintenance cost.

In the present embodiment, as shown in FIG. 1, in order to detect the change of motion state of the motor 5, the feedback module 6 is a magnetic encoder; the magnetic encoder detects the rotating speed of the motor 5 and sends the rotating speed data of the motor 5 to the controlling module 3. Particularly, the magnetic encoder detects the rotating speed information of the target object 1 and converts the rotating speed information of the target object 1 into an electrical signal output, which is transmitted to the controlling module 3 as feedback of the motion control.

In the present embodiment, as shown in FIG. 1, in order to better control the speed of the motor 5, the driving module 4 is a FOC vector control inverter, and the FOC vector control inverter is mainly used to adjust the rotating speed of the motor 5, so that the stabilizer can better adapt to target objects 1 with different weights and sizes.

Figure 2:
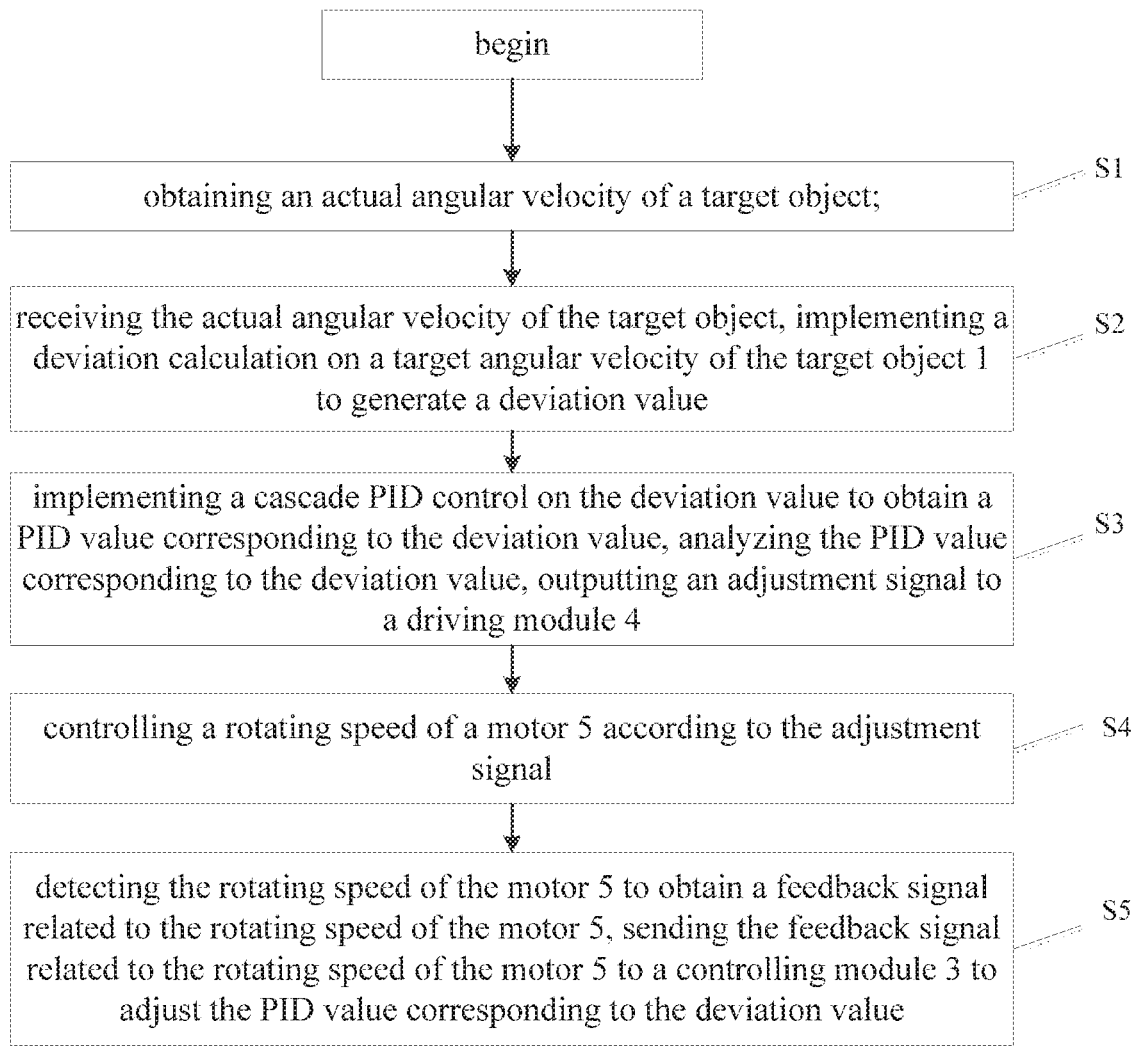
FIG. 2 is a flowchart of a stabilizer control method according to an embodiment of the present invention.

In the present embodiment, as shown in FIG. 2, in order to achieve the same object, the present invention further provides a stabilizer control method comprising the following steps:

S1, obtaining an actual angular velocity of a target object;

S2, receiving the actual angular velocity of the target object, implementing a deviation calculation on a target angular velocity of the target object 1 to generate a deviation value;

S3, implementing a cascade PID control on the deviation value to obtain a PID value corresponding to the deviation value, analyzing the PID value corresponding to the deviation value, outputting an adjustment signal to a driving module 4;

S4, controlling a rotating speed of a motor 5 according to the adjustment signal;

S5, detecting the rotating speed of the motor 5 to obtain a feedback signal related to the rotating speed of the motor 5, sending the feedback signal related to the rotating speed of the motor 5 to a controlling module 3 to adjust the PID value corresponding to the deviation value.

For more information, in S1, the detecting module 2 is a gyro. The gyro detects the angular velocity of the target object 1 for the controlling module 3. In S2, the controlling module 3 implementing a deviation calculation between the target angular velocity and the actual angular velocity of the target object, so as to generate a deviation value between the target angular velocity and the actual angular velocity of the target object, thus obtaining adjustment magnitude of the rotating speed of the motor 5. In S3, the controlling module 3 implements a cascade PID control on the deviation value, thereby the stability of the controlling module 3 can be effectively improve, as well as variation sensitivity of the deviation value, and the cascade PID control has better robustness and adaptability, thereby gradually adjusting the deviation value to the PID value needed in the system. The variances of the detecting module 2 are different due to different moments of inertia of target objects, and the deviation values obtained by the controlling module 3 are also different. The PID characteristic values obtained by the controlling module 3 through the cascade PID control are also different, so that the controlling module 3 can issue an adjustment signal to adjust the signal of the motor 5. Therefore, the PID characteristic values are adjusted adaptively to realize that the stabilizer can adapt to different target objects. In S4, the driving module 4 is a FOC vector control inverter. The FOC vector control inverter can adjust its own output frequency, the magnitude or angle of the output voltage, and the FOC vector control inverter is electrically connected to the motor 5, so that the rotating speed of the motor 5 can be controlled; In S5, the feedback module 6 is a magnetic encoder; the magnetic encoder detects the rotating speed of the motor 5 and generate a feedback signal related to the rotating speed of the motor 5, so as to determine whether the target object 1 can be stably fixed on the stabilizer with the rotation speed of the motor 5; the controlling module 3 compares the feedback signal with the target posture information of the target object, and adjusts the output operational variables to enable the control module, the driving module 4, the motor 5 and feedback module 6 to form a closed loop system. Since vibration state of the motor 5 reflects vibration state of the target object, PID range is constantly adjusted according to the vibration state of the motor 5 to obtain the adaptive matching PID characteristic values.

The stabilizer control method according to the present disclosure is based on the stabilizer control system, which has high reliability and efficiency.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A stabilizer control system, wherein the system comprises a detecting module, a controlling module, a driving module, a feedback module and a motor;
   the detecting module detects posture information of a stabilizer, and sends the posture information to the controlling module;
   a first input end of the controlling module is connected with the detecting module; the controlling module receives the posture information of the stabilizer and issues a command to the driving module according to a preset control strategy;
   an input end of the driving module is connected with an output end of the controlling module, the output end of the driving module is electrically connected with the motor; the driving module receives the command from the controlling module and adjusts a rotating speed of the motor according to the command;
   the feedback module detects the rotating speed of the motor and sends rotating speed data of the motor to the controlling module.

2. The stabilizer control system according to claim 1, wherein the detecting module is a gyro; the gyro detects the posture information of the stabilizer, and sends the posture information of the stabilizer to the controlling module.

3. The stabilizer control system according to claim 1, wherein the motor is a brushless motor.

4. The stabilizer control system according to claim 1, wherein the feedback module is a magnetic encoder; the magnetic encoder detects the rotating speed of the motor and sends the rotating speed data of the motor to the controlling module.

5. The stabilizer control system according to claim 1, wherein the driving module is a FOC vector control inverter.

6. A stabilizer control method, wherein the method comprises:
   S1, obtaining an actual angular velocity of a target object;
   S2, receiving the actual angular velocity of the target object, implementing a deviation calculation on a target angular velocity of the target object to generate a deviation value;
   S3, implementing a cascade PID control on the deviation value to obtain a PID value corresponding to the deviation value, analyzing the PID value corresponding to the deviation value, outputting an adjustment signal to a driving module;
   S4, controlling a rotating speed of a motor according to the adjustment signal;
   S5, detecting the rotating speed of the motor to obtain a feedback signal related to the rotating speed of the motor, sending the feedback signal related to the rotating speed of the motor to a controlling module to adjust the PID value corresponding to the deviation value.

\* \* \* \* \*